O. W. & H. F. Burnham,
Elevator.
Nº 80,804.      Patented Aug. 11, 1868.
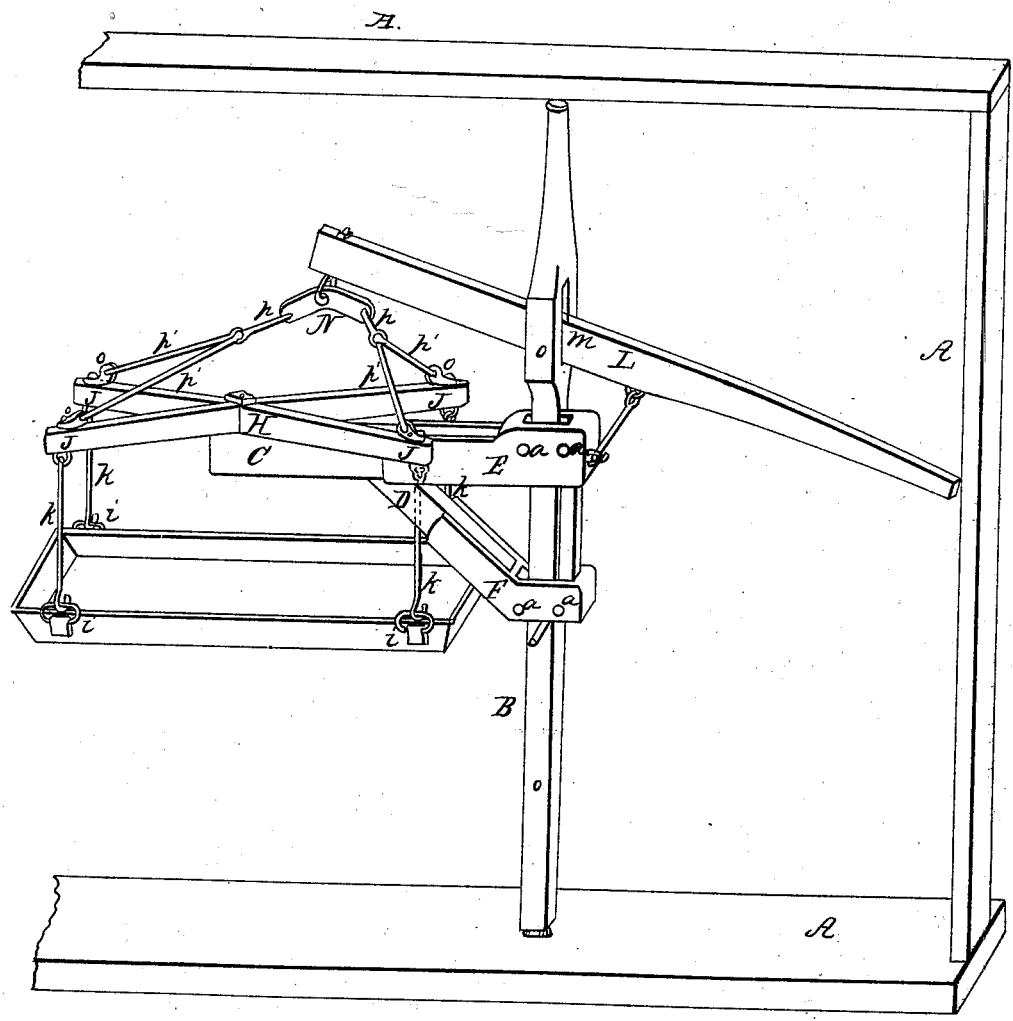
Witnesses
Theo Tusche
W. Trewin
Inventors
O. W. Burnham
H. F. Burnham
Per Munn
Attorneys

United States Patent Office.

ORAMUS W. BURNHAM, OF HILLSBOROUGH, AND HENRY F. BURNHAM, OF ACWORTH, NEW HAMPSHIRE.

Letters Patent No. 80,804, dated August 11, 1868; antedated March 9, 1868.

IMPROVED ELEVATOR FOR SIRUP-PANS.

*The Schedule referred to in these Letters Patent and making part of the same.*

TO ALL WHOM IT MAY CONCERN:

Be it known that we, ORAMUS W. BURNHAM, of Hillsborough, in the county of Hillsborough, and State of New Hampshire, and HENRY F. BURNHAM, of Acworth, in the county of Sullivan, and State of New Hampshire, have invented a new and improved Sirup-Pan Elevator; and we do hereby declare that the following is a full, clear, and exact description thereof, which will enable those skilled in the art to make and use the same, reference being had to the accompanying drawings, forming part of this specification.

This invention relates to a new and improved device for elevating and handling evaporating-pans; and the invention consists in attaching the pan to a crane, whereby it may be raised and lowered by a lever, and otherwise moved to and from the arch or furnace, as may be desired, as will hereinafter be described.

The drawing represents an elevation of the apparatus, with an evaporating-pan attached.

Similar letters of reference indicate corresponding parts.

A represents the frame by which the crane is supported.

B is the standard of the crane, which is attached to the frame A by pivots at its top and bottom ends, upon which it freely turns.

C is the arm of the crane, and

D is the brace, attached thereto by bolts, or in any substantial manner.

The arm and brace are attached to the standard by metallic fastenings, (E and F,) which form mortises for the standard, which mortises contain friction-rolls, seen at $a$ in the drawing, which rolls bear against the standard, and allow the arm to be raised and lowered, or moved up and down, without friction.

G represents the pan, which is suspended from a cross of four arms, which rests upon the top of the arm C of the crane.

H is this cross, and

J represents its four arms.

$k$ represents the four hooks or rods by which the pan is suspended.

$i$ represents the handles (two on each side of the pan) to which the hooks $k$ are attached.

L is a lever, which passes through a mortise in the standard of the crane, as seen at $m$.

N is an evener, which is attached to the short end of the lever, as seen in the drawing.

The evener N is connected with the four arms of the cross H, by rods, in such a manner that the arm of the crane and the pan are raised vertically, by being properly balanced from the end of the lever by the evener N and the rods connected therewith.

For the proper adjustment of these rods, they are connected with the blocks $o$, on the top of the arms J, which turn on pivots, the pivots being the shanks of the eyes which pass up from the under-side of the arms, to which eyes the suspension-rods $k$ are attached.

$p$ $p$ are two short rods, connected with the ends of the evener, from each of which extend two rods $p'$, which branch off to the four arms of the cross, which rods are attached to the blocks $o$, as seen in the drawing.

R is a hook, attached to the lever L, which, when the pan is raised from the arch, as seen in the drawing, is hooked into a staple in the arm of the crane, as seen, so that the pan is thereby held up from the arch.

There are also holes for a rest-pin in the standard B, so that the brace of the arm may rest on a pin inserted, which pin may sustain the weight of the pan when it is raised from the arch, or when in any other desired position.

Having thus described our invention, we claim as new, and desire to secure by Letters Patent—

1. The evener N, rods $h$ $h$ $h$ $h$, cross H, in combination with arm C, and brace D, lever L, and standard B, arranged substantially as and for the purposes herein set forth.

2. The pan G, in combination with the hooks $k$ $k$ $k$ $k$, cross H, substantially as and for the purpose specified.

ORAMUS W. BURNHAM,
HENRY F. BURNHAM.

Witnesses:
J. A. WOOD,
H. L. SILSBY.